(12) United States Patent
Bhoria et al.

(10) Patent No.: US 11,496,628 B2
(45) Date of Patent: Nov. 8, 2022

(54) CHARGING FILTERING FUNCTION

(71) Applicant: Cisco Technology, Inc., San Jose, CA (US)

(72) Inventors: Rajpal Bhoria, Haryana (IN); Praveen Joseph, Bangalore (IN); Manoj Kumar Kushwaha, Bangalore (IN); Timothy Peter Stammers, Raleigh, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 91 days.

(21) Appl. No.: 17/061,948

(22) Filed: Oct. 2, 2020

(65) Prior Publication Data

US 2022/0109759 A1    Apr. 7, 2022

(51) Int. Cl.
*H04M 11/00*     (2006.01)
*H04M 15/00*     (2006.01)
*H04W 4/24*      (2018.01)

(52) U.S. Cl.
CPC .......... *H04M 15/41* (2013.01); *H04M 15/07* (2013.01); *H04W 4/24* (2013.01)

(58) Field of Classification Search
CPC ...... H04M 15/00; H04M 15/07; H04M 15/06; H04M 15/08; H04M 15/09; H04M 15/10; H04M 15/26; H04M 15/31; H04M 15/28; H04M 15/30; H04M 15/34; H04M 15/36; H04M 15/38; H04M 15/39; H04M 15/41; H04M 15/42; H04M 15/43; H04M 15/8214; H04M 15/82; H04M 15/8207; H04M 15/8221; H04M 15/8228; H04M 2215/0164; H04M 2215/44; H04M 2215/66; H04M 2215/64

USPC ........................................................ 455/406
See application file for complete search history.

(56) References Cited

U.S. PATENT DOCUMENTS

| | | | |
|---|---|---|---|
| 7,962,120 B2 * | 6/2011 | Cai | ........................ H04L 12/66 |
| | | | 455/406 |
| 2007/0036312 A1 | 2/2007 | Cai et al. | |
| 2015/0245241 A1 | 8/2015 | Posz | |

(Continued)

FOREIGN PATENT DOCUMENTS

WO    2020135848 A1    7/2020

OTHER PUBLICATIONS

Törnkvist, Robert et al., "Charging and Billing Architecture for 5G Network", Journal of ICT, vol. 7 2, 185-194. River Publishers, May 20, 2019, 10 pages.

(Continued)

*Primary Examiner* — Huy C Ho
(74) *Attorney, Agent, or Firm* — Edell, Shapiro & Finnan, LLC

(57) ABSTRACT

In one example, a charging filtering function may obtain a request for one or more rules that control whether or when one or more charging data records associated with a user equipment are to be provided to one or more billing systems. The request includes an identification of the user equipment. Based on the identification of the user equipment, the charging filtering function may identify the one or more rules. The charging filtering function may provide the one or more rules to control whether or when the one or more charging data records associated with the user equipment are to be provided to the one or more billing systems.

20 Claims, 8 Drawing Sheets

(56) References Cited

U.S. PATENT DOCUMENTS

2020/0092424 A1  3/2020  Qiao et al.
2020/0145538 A1  5/2020  Qiao et al.

OTHER PUBLICATIONS

ETSI, "Digital cellular telecommunications system (Phase 2+) (GSM); Universal Mobile Telecommunications System (UMTS); LTE; Telecommunication management; Charging management; Charging architecture and principles (3GPP TS 32.240 version 15.2.0 Release 15)", ETSI TS 132 240 V15.2.0, Jun. 2018, 61 pages.
Cisco Systems, Inc., "Ultra Cloud Core 5G Session Management Function, Release 2020.02—Configuration and Administration Guide", Jul. 10, 2020, 738 pages.

* cited by examiner

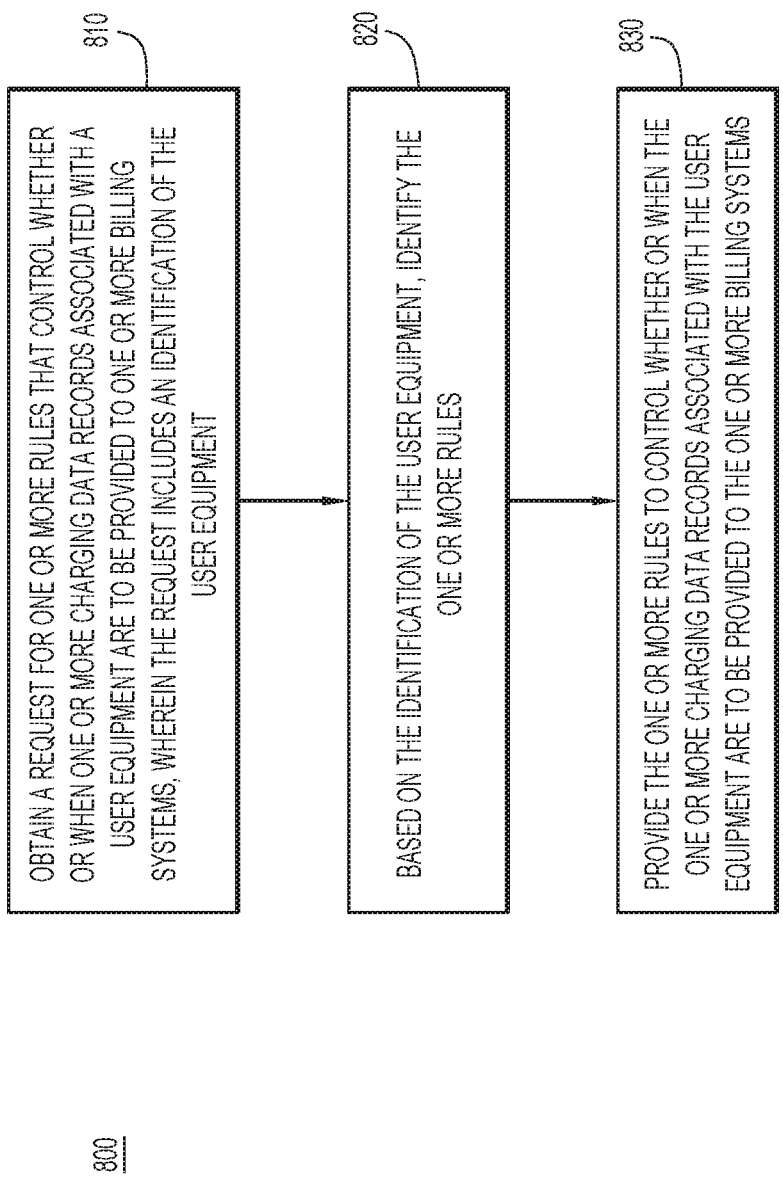

US 11,496,628 B2

CHARGING FILTERING FUNCTION

TECHNICAL FIELD

The present disclosure relates to telecommunications technology.

BACKGROUND

As fifth generation (5G) cellular networks are increasingly adopted and deployed, charging volumes/transactions are expected to grow and fluctuate dramatically. In 5G, network functions can be dynamically instantiated and scaled, and are expected to support tens of millions of devices. There will likely be millions of transactions per second, which may potentially grow to trillions of transactions per day in the near future.

BRIEF DESCRIPTION OF THE DRAWINGS

FIG. 8 illustrates a flowchart of a method for performing functions associated with operations discussed herein, according to an example embodiment.

DESCRIPTION OF EXAMPLE EMBODIMENTS

Overview

In one example embodiment, a charging filtering function may obtain a request for one or more rules that control whether or when one or more charging data records associated with a user equipment are to be provided to one or more billing systems. The request includes an identification of the user equipment. Based on the identification of the user equipment, the charging filtering function may identify the one or more rules. The charging filtering function may provide the one or more rules to control whether or when the one or more charging data records associated with the user equipment are to be provided to the one or more billing systems.

Example Embodiments

Figure 1:
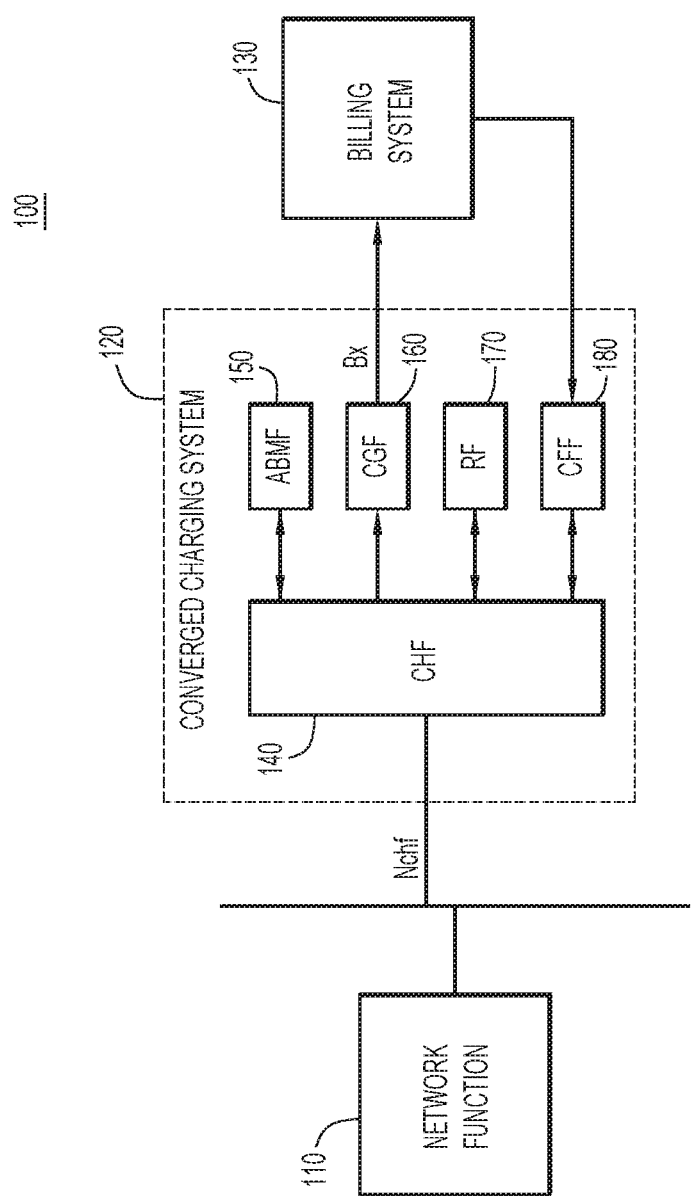
FIG. 1 illustrates a block diagram of a system including a Charging Filtering Function (CFF) configured to manage one or more rules that control whether or when one or more Charging Data Records (CDRs) are to be provided to one or more billing systems, according to an example embodiment.

FIG. 1 illustrates a block diagram of an example system 100. System 100 includes network function 110, converged charging system 120, and billing system 130. Converged charging system 120 includes Charging Function (CHF) 140, Account Balance Management Function (ABMF) 150, Charging Gateway Function (CGF) 160, Rating Function (RF) 170, and Charging Filtering Function (CFF) 180.

Network function 110 may be a Session Management Function (SMF) configured to provide charging events (e.g., usage record generations) to converged charging system 120 (e.g., over the Nchf interface) on behalf of a User Equipment (UE). Converged charging system 120 may in turn generate Charging Data Records (CDRs) based on the charging events and provide the CDRs to billing system 130 (e.g., over the Bx interface). The charging events and CDRs may be associated with the UE. Billing system 130 may be a north-bound Operations System Support (OSS) end system configured to charge in online or offline billing mode. Billing system 130 may have any suitable entity associated therewith (e.g., enterprise, operator, Internet of Things (IoT) entity, etc.).

CHF 140 may be configured to obtain the charging events from network function 110, generate the CDRs, and provide the CDRs to CGF 160. ABMF 150 may be configured to provide, to CHF 140, information regarding one or more balances associated with an account of the UE. CGF 160 may be configured to obtain the CDRs from CHF 140 (e.g., obtain reports of creation and release of charging records such as CDR storage locations), process the CDRs, and provide the CDRs to billing system 130. RF 170 may be configured to provide, to CHF 140, information regarding a charging rate(s) corresponding to the charging events. CHF 140 may generate the CDRs based on the information obtained from ABMF 150 and RF 170.

Network traffic in cellular networks is growing rapidly, and a correspondingly large number of charging events is increasingly provided to converged charging systems. This will place an enormous load on existing north-bound charging systems (e.g., online/offline billing systems configured for billing and rating functions) hosted in the cloud to handle the increased traffic and variabilities. A conventional converged charging system would generate a multitude of CDRs, corresponding to the large number of charging events, and provide the CDRs to a billing system. The large volume of CDRs could require an inordinate amount of bandwidth, overwhelming the converged charging system, the Nchf and/or Bx interfaces, and/or the billing system.

Accordingly, CFF 180 is provided to manage rules that control whether or when one or more CDRs are to be provided to billing system 130. Briefly, CFF 180 may obtain a request for one or more rules that control whether or when one or more CDRs associated with a UE are to be provided to billing system 130. The request includes an identification of the UE. Based on the identification of the UE, CFF 180 may identify the one or more rules and provide the one or more rules to control whether or when the one or more CDRs associated with the UE are to be provided to billing system 130.

CFF 180 may thereby reduce the required load by filtering/avoiding/skipping unnecessary traffic (e.g., CDRs), instead of permitting every CDR to be sent to billing system 130. This may be useful/economical for both network operators and one or more entities associated with billing system 130. These techniques may provide efficient integration with 5G network providers while reducing the operational costs (and increase efficiency) by leveraging CFF 180 in the underlying architecture to filter out unnecessary traffic.

Figure 2:
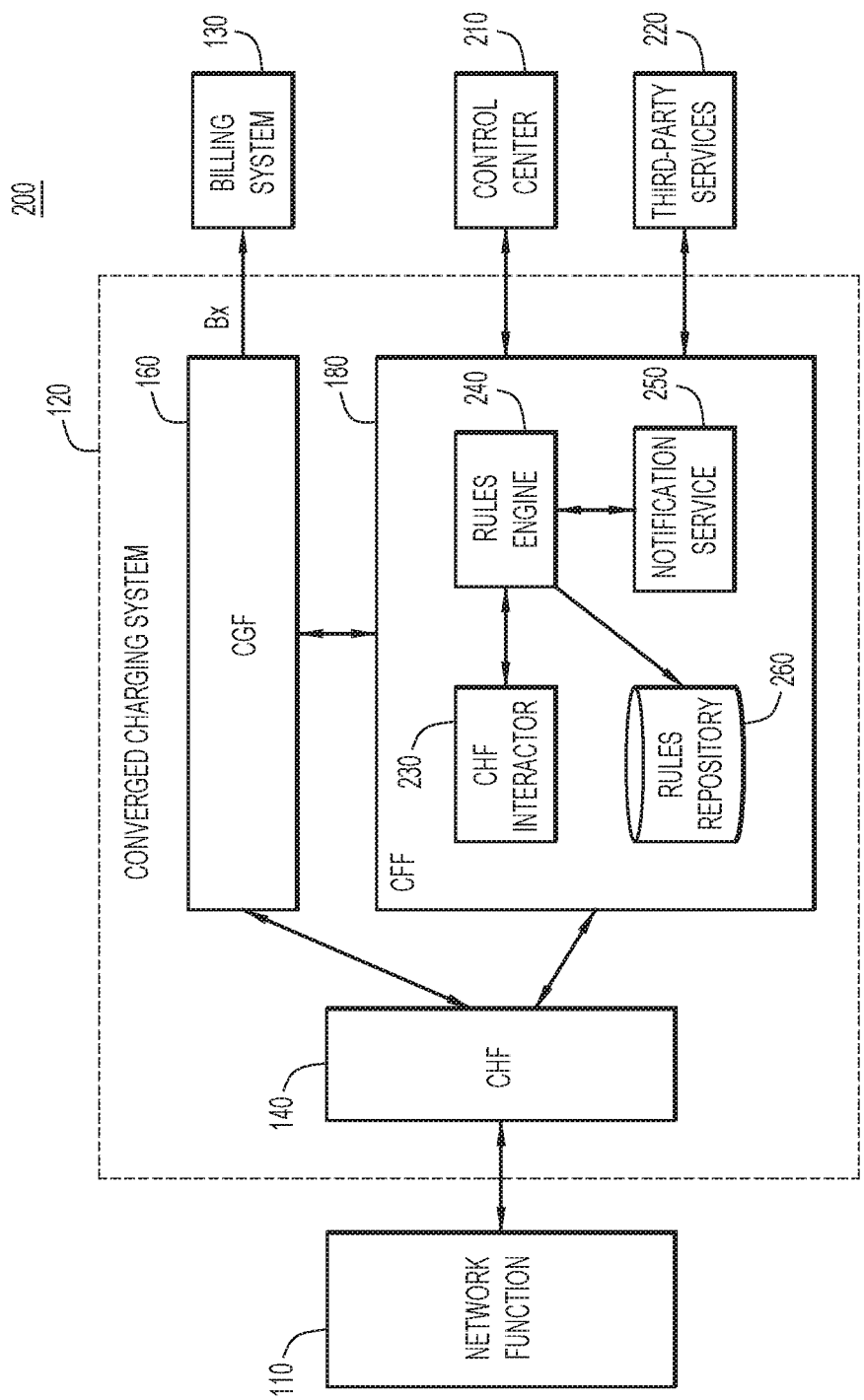
FIG. 2 illustrates a block diagram of a system including a CFF having various functional components to manage one or more rules that control whether or when one or more CDRs are to be provided to a billing system, according to an example embodiment.

With continued reference to FIG. 1, FIG. 2 illustrates a block diagram of an example system 200. System 200 includes network function 110, converged charging system 120 (including CHF 140, CGF 160, and CFF 180), and billing system 130. System 200 also includes Control Center 210 and third-party services 200. Control Center 210 may be any suitable control center, such as an IoT Control Center, a Communication Service Management Function (CSMF), etc. Control Center 210 may include a provision for one or more entities to define one or more filtering rules/policies and push the rules to CFF 180. Third-party services 220 may be any suitable service, such as a location-based service that indicates a location of a UE (e.g., location-based services, location changes, etc.).

As further shown, CFF 180 includes various functional components to manage one or more rules that control whether or when one or more CDRs are to be provided to billing system 130. CFF 180 includes CHF interactor 230, rules engine 240, notification service 250, and rules repository 260. CHF interactor 230 may support different filtering behaviors for various event types by obtaining, from CHF 140, a charging filter request to filter one or more CDRs and providing an appropriate response to CHF 140. The filter request sent by CHF 140 may include a UE identifier (e.g., a Subscription Permanent Identifier (SUPI)), the units of usage for the session in which the UE is participating, and an operation type indicating whether the request is to create, update, or release a charging record. CHF 140 may use the response to provide a converged charging service.

Rules engine 240 may support operations to add/modify/delete rules. In particular, rules engine 240 may enable an entity associated with billing system 130 to define different types of rules to support filtering behavior. The rules obtained from billing system 130 may include the rule type, the range of SUPIs to which the rule(s) apply, and any trigger(s) that should be used for the set of devices. In the absence of SUPI values, the rule(s) may apply to all devices/triggers. Rules engine 240 may also determine the type of filtering rules matched against a generated charging volume and direct CHF interactor 230 to provide appropriate response triggers to CHF 140. Any suitable type of rule may be utilized, such as a usage type, a rate-limit type, or a custom type.

A usage type rule may control whether one or more CDRs associated with a UE are to be provided to one or more billing systems (e.g., billing system 130) based on an amount of information to be carried in the one or more CDRs. For instance, a usage type rule may be a rule that requires that reported charging data have a minimum volume (e.g., in bytes) to consider the reported charging data for CDR processing. This may prevent any CDRs below a given volume threshold from being sent to billing system 130. In one specific example, a usage type rule may cause CFF 180 to intelligently identify zero-byte CDRs, which are typically used as keep-alive messages even when the UE is not in use, as benign transactions that should be suppressed/dropped. This rule may permit non-zero-byte CDRs, which indicate transactions that require rating/balance updates for converged charging system 120, to be provided to billing system 130. Thus, a usage type rule may control whether or not CDRs are to be passed on to one or more billing systems.

A rate-limit type rule may control when one or more CDRs associated with a UE are to be provided to one or more billing systems (e.g., billing system 130) based on a frequency at which the one or more CDRs are to be provided to the one or more billing systems. For instance, such a rule may indicate that one or more CDRs are to be provided to billing system 130 once every given number of minutes (e.g., fifteen minutes, thirty minutes, etc.). Thus, in one example, CFF 180 may intelligently rate-limit (e.g., control the rate of) charging events triggered towards CHF 140 in order to limit the rate of volume traffic.

A custom type rule may include any suitable custom rule specified, for instance, by an entity associated with billing system 130. The entity may specify the custom rule through a policy management User Interface (UI). The custom rule may control whether or when one or more CDRs associated with a UE are to be provided to billing system 130 based on a location of the UE. Such a rule may indicate that a given usage threshold or rate limit is to apply when a UE is in a given location. For example, CDR generation may be rate-limited to once every thirty minutes when the UE is in a roaming location. Notification service 250 may obtain updates from third-party services 220 regarding certain events (e.g., UE location changes between a home location and a roaming location) in order to support CDR filtering behavior according to the custom rule(s).

Rules repository 260 may store/maintain a mapping defining various rules that control whether or when one or more CDRs associated with a UE are to be provided to billing system 130. Rules repository 260 may define different filtering behaviors for the UE (e.g., usage generation checks, rate-limit record generation, etc.) based on the different types of filtering policies/rules (e.g., usage, rate-limit, custom, etc.). The rules may be defined/established by the entity associated with billing system 130 to support various filtering behaviors. Rules repository 260, in conjunction with rules engine 240, may thus enable CFF 180 to enforce rules defined by the entity associated with billing system 130.

Table 1 below illustrates example rules that may be stored by rules repository 260. The numbers in the "Threshold" column may be measured in bytes, and the numbers in the "Rate Limit" column may be measured in seconds.

TABLE 1

| Rule ID | Rule Type | Description | Min SUPI | Max SUPI | Threshold | Rate Limit | Custom Trigger |
|---|---|---|---|---|---|---|---|
| 1-1 | Usage | Suppress CDR generation for usages <5 | 10001 | 10010 | 5 | NA | NA |

TABLE 1-continued

| Rule ID | Rule Type | Description | Min SUPI | Max SUPI | Threshold | Rate Limit | Custom Trigger |
|---|---|---|---|---|---|---|---|
| 1-2 | Usage | Suppress CDR generation for usages <15 | 10010 | 30000 | 15 | NA | NA |
| 2-1 | Rate limit | Limit generation rate to once every 1800 seconds | 30001 | 30010 | NA | 1800 | NA |
| 2-2 | Rate limit | Limit generation rate to once every 900 seconds | 20001 | 20057 | NA | 900 | NA |
| 3-1 | Custom | Suppress CDR generation for usages <5 when device moves to Roaming ('Atlanta') | 50002 | 60023 | 5 | NA | On location change: destination = 'Atlanta' |
| 3-2 | Custom | Limit generation rate to once every 900 seconds when device moves to Roaming('Atlanta') | 60023 | 70023 | NA | 900 | On location change: destination = 'Atlanta' |

In one example, rules engine 240 may filter out a charging volume based on the usage threshold rules illustrated in Table 1. Consider a UE with a SUPI of 10002 that generates a charge record of usage two bytes. Based on the SUPI, rules engine 240 may identify the applicable rule as Rule 1-1. Example pseudocode for executing Rule 1-1 is provided as follows.

```
Usage Rule-x -> {
IF ( (SUPI.usage <= x.threshold))
    then return SKIP_CDR_GENERATION;
ELSE
Break;
}
```

In another example, rules engine 240 may rate-limit CDR generation based on the rate-limit filtering rules illustrated in Table 1. Consider a UE with a SUPI of 30002 that generates a charge record of usage ten bytes. Based on the SUPI, rules engine 240 may identify the applicable rule as Rule 2-1. Example pseudocode for executing Rule 2-1 is provided as follows.

```
Ratelimit Rule-x -> {
IF ( SUPI is in range (Min(SUPI), Max(SUPI))
    then prepare 'Response Triggers' for CHF 140 to limit generation rate to once per 1800 seconds
ELSE
Break;
}
```

In another example, rules engine 240 may alter CDR generation behavior based on a location change event, as indicated by third-party services 220, based on the custom rules illustrated in Table 1. Consider a UE with a SUPI of 60024 that moves from a home location (e.g., San Jose) to a remote network location (e.g., Atlanta). In this roaming scenario, the entity associated with billing system intends for CDRs to be generated once every fifteen minutes. Based on the SUPI, rules engine 240 may identify the applicable rule as Rule 3-2. Example pseudocode for executing Rule 3-2 is provided as follows.

```
Location Rule-x -> {
IF ( inRoaming(SUPI) && SUPI.location= x.Location )
    then prepare 'Response Triggers' for CHF 140 to limit generation rate to once per 900 seconds
ELSE ( E1.Dx.Loc= Loc2 )
    then s-NSSAI=s-NSSAI-1-2
}
```

Figure 3:
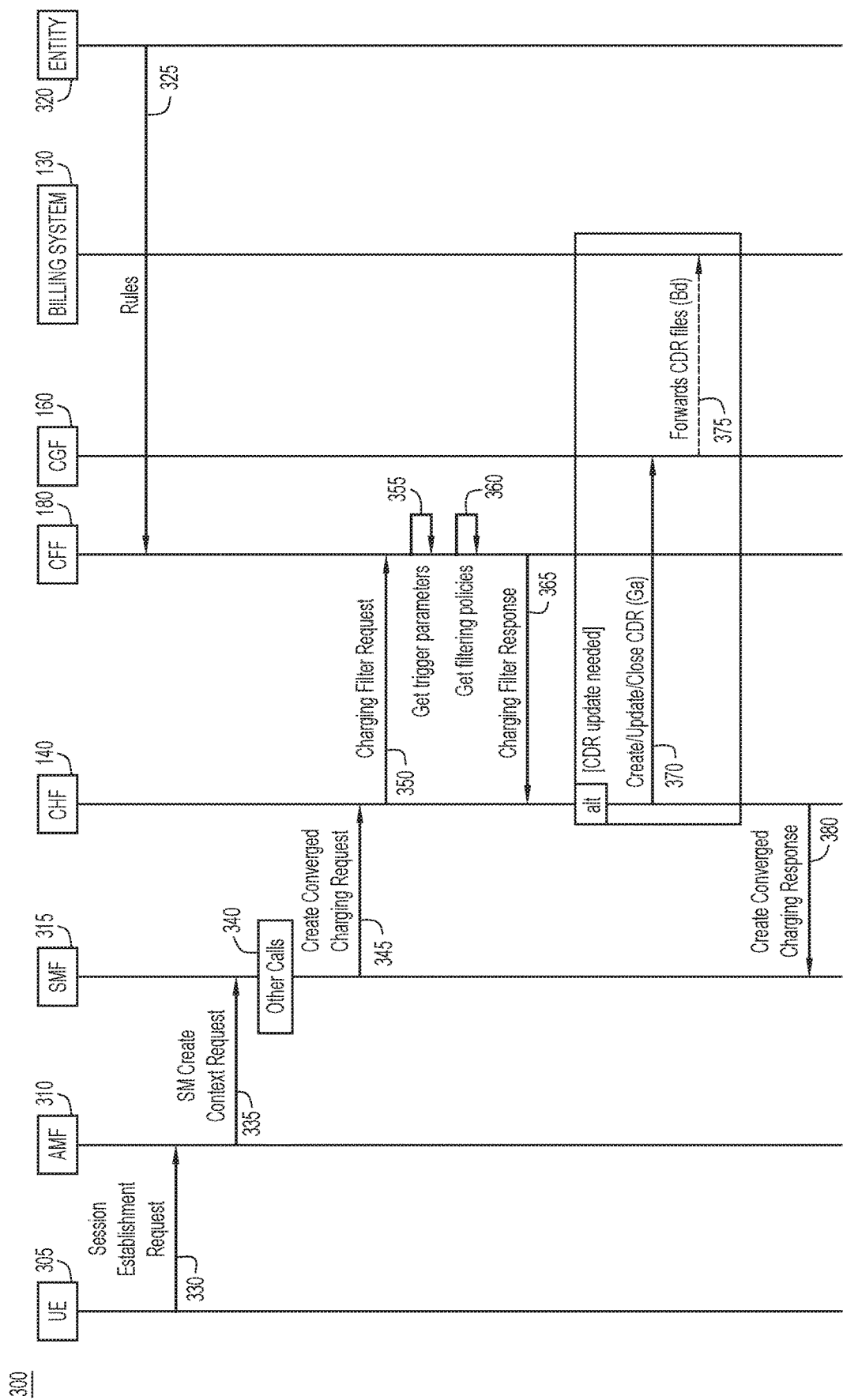
FIG. 3 illustrates a sequence flow diagram of a method for managing one or more rules that control whether or when one or more CDRs are to be provided to a billing system, according to an example embodiment.

With continued reference to FIG. 1, FIG. 3 illustrates a sequence flow diagram of an example method 300 for managing one or more rules that control whether or when one or more CDRs are to be provided to billing system 130. Method 300 demonstrates interactions between CFF 180 and other 5G components for an example charging record event in order to filter 5G traffic. Method 300 may involve operations performed by various actors, including UE 305, Access and Mobility Management Function (AMF) 310, SMF 315, CHF 140, CFF 180, CGF 160, Billing System 130, and entity 320. UE 305 may be a UE for which charging data is being reported. AMF 310 may be configured to manage connection and mobility tasks on behalf of UE 305. SMF 315 may be network function 110. Entity 320 may be an entity associated with billing system 130.

At operation 325, CFF 180 obtains one or more rules from entity 320 (e.g., via Control Center 210). The one or more rules may be generated by entity 320. This may allow entity 320 to configure filtering rules on CFF 180 for one or more devices, such as UE 305. At operation 330, AMF 310 obtains a session establishment request from UE 305. At operation 335, SMF 315 obtains a Session Management (SM) create context request (e.g., an Nsmf_PDUSession_CreateSMContext Request) from AMF 310. At operation 340, SMF 315 may make other calls to actors such as Unified Data Management (UDM), Policy Control Function (PCF), etc. At operation 345, CHF 140 obtains a create converged charging request from SMF 315. The create converged charging request may be a Nchf_ConvergedCharging service sent to CHF 140 to create, update, or release the charging resource.

At operation 350, CFF 180 obtains a charging filter request from CHF 140. This may help CHF 140 to enforce one or more rules that control whether or when one or more CDRs associated with UE 305 are provided to billing system 130. For instance, the charging filter request may prompt CFF 180 to check for one or more filtering rules associated with UE 305 (e.g., the rules obtained by CFF 180 during operation 325). The filtering rules may be volume-based or rate-limit-based.

At operation 355, CFF 180 identifies parameters for triggers to be set for UE 305 based on the one or more rules. At operation 360, CFF 180 obtains the filtering policy/rule(s) to be applied for UE 305. At operation 365, CFF 180 provides a charging filtering response to CHF 140. The charging filtering response may indicate whether a CDR update should occur (e.g., whether the incoming charging data should be discarded) based on the one or more filtering rules, and may further include any triggers to be set by SMF 315. For example, if the relevant rule(s) is/are volume-based, the charging filtering response may indicate whether to discard the CDR depending on whether the amount of bytes in the CDR is below a minimum threshold. If the relevant rule(s) is/are rate-limit-based, the charging filter response may indicate how often CDRs associated with UE 305 should be sent to billing system 130.

At operation 370, if CFF 180 indicates that the CDR update should occur (e.g., the charging data should not be discarded), CHF 140 forwards the CDR request to CGF 160 over the Ga interface. At operation 375, CGF 160 generates the CDR files and forwards the CDR files to billing system 130 over the Bd interface. At operation 380, CHF 140 provides, to SMF 315, a create converged charging response (e.g., a Hypertext Transfer Protocol (HTTP) 2xx response indicating successful processing of the request). For example, if the rule(s) is/are rate-limit-based, the create converged charging response may indicate how often SMF 315 should send charging data to CHF 140. SMF 315 may determine when to send charging volumes to CHF 140 based on the create converged charging response. Once session establishment is accepted, AMF 310 may make calls that request the Protocol Data Unit (PDU) session, to the cellular access point (e.g., gNodeB) to which UE 305 is attached. The gNodeB may send a configuration message to UE 305.

Thus, as demonstrated by method 300, CFF 180 may interact with CHF 140 to filter traffic between CHF 140 and billing system 130. In one example, CFF 180 interacts with CHF 140 to identify benign transactions/usage sessions based on filtering rules defined by entity 320 and skip/avoid sending corresponding CDRs to billing system 130. In another example, CFF 180 interacts with CHF 140 to limit record generation rate/frequency based on rate-limit rules defined by entity 320 using the interface between CHF 140 and SMF 315. In still another example, CFF 180 interacts with third-party services 220 to allow custom-defined filtering behavior for given events.

Figure 4:
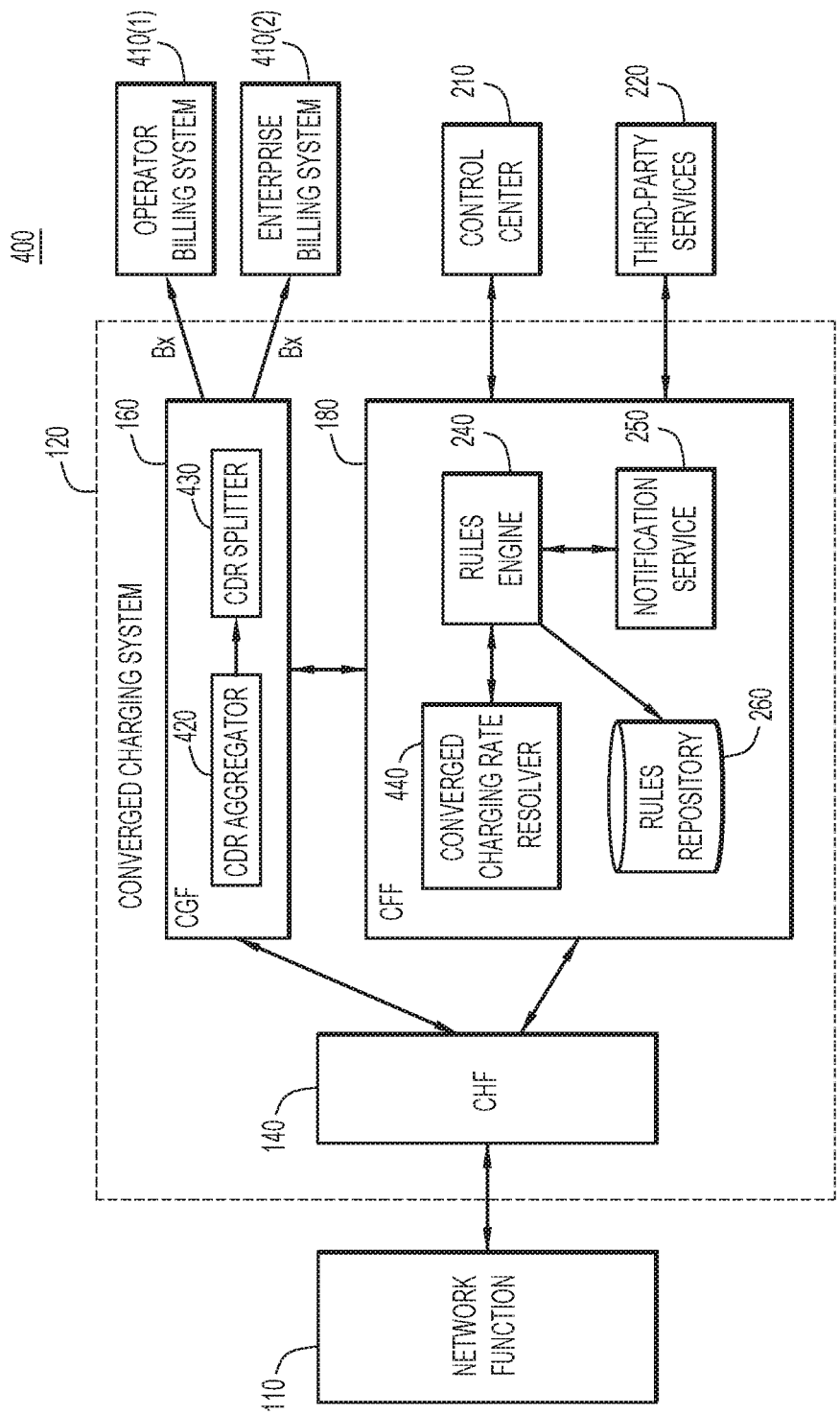
FIG. 4 illustrates a block diagram of a system including a CFF having various functional components to manage one or more rules that control whether or when one or more CDRs are to be provided to multiple billing systems, according to an example embodiment.
Figure 5:
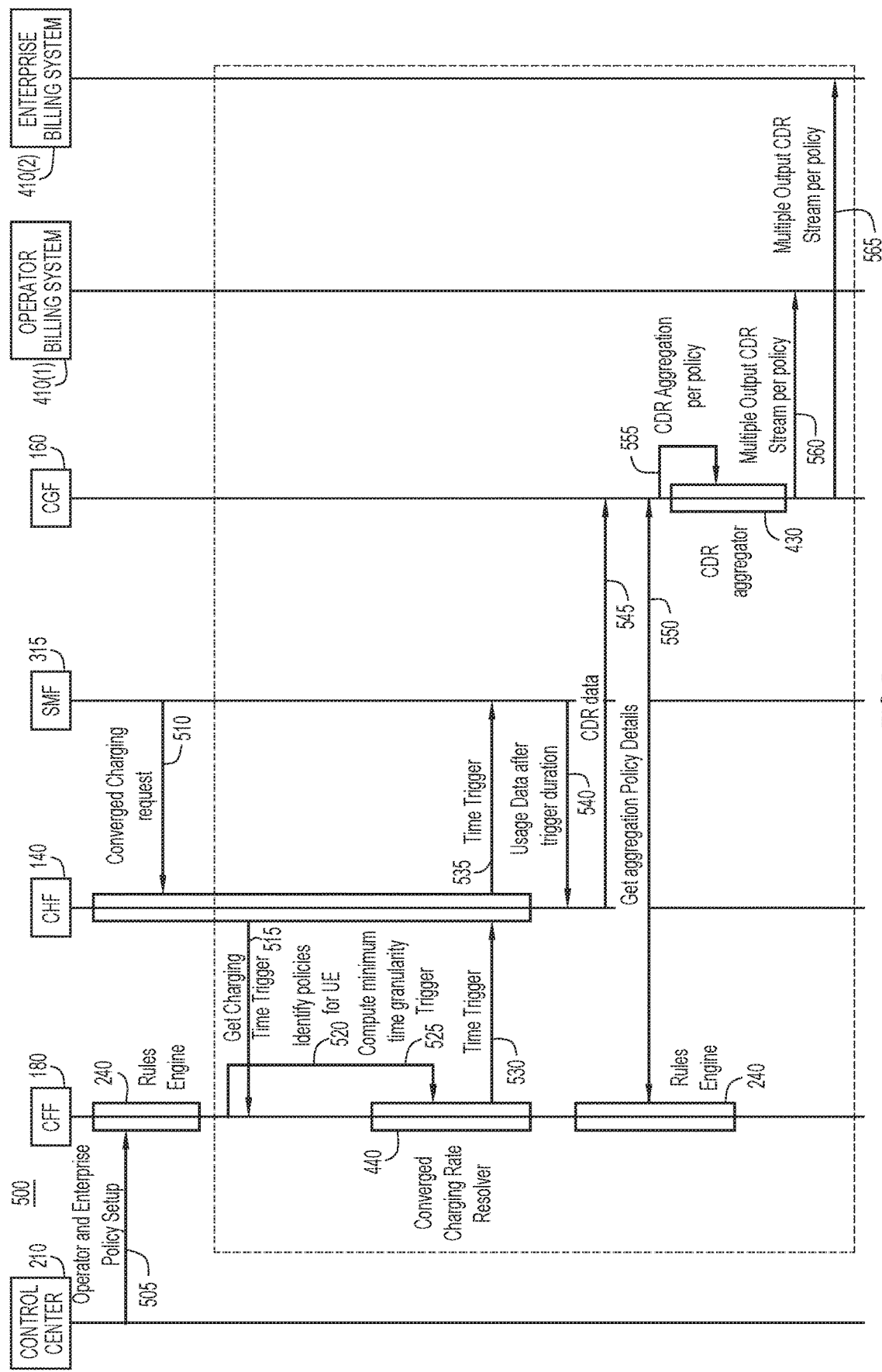
FIG. 5 illustrates a sequence flow diagram of a method for managing one or more rules that control whether or when one or more CDRs are to be provided to multiple billing systems based on one or more frequencies at which the one or more CDRs are to be provided to the multiple billing systems, according to an example embodiment.
Figure 6:
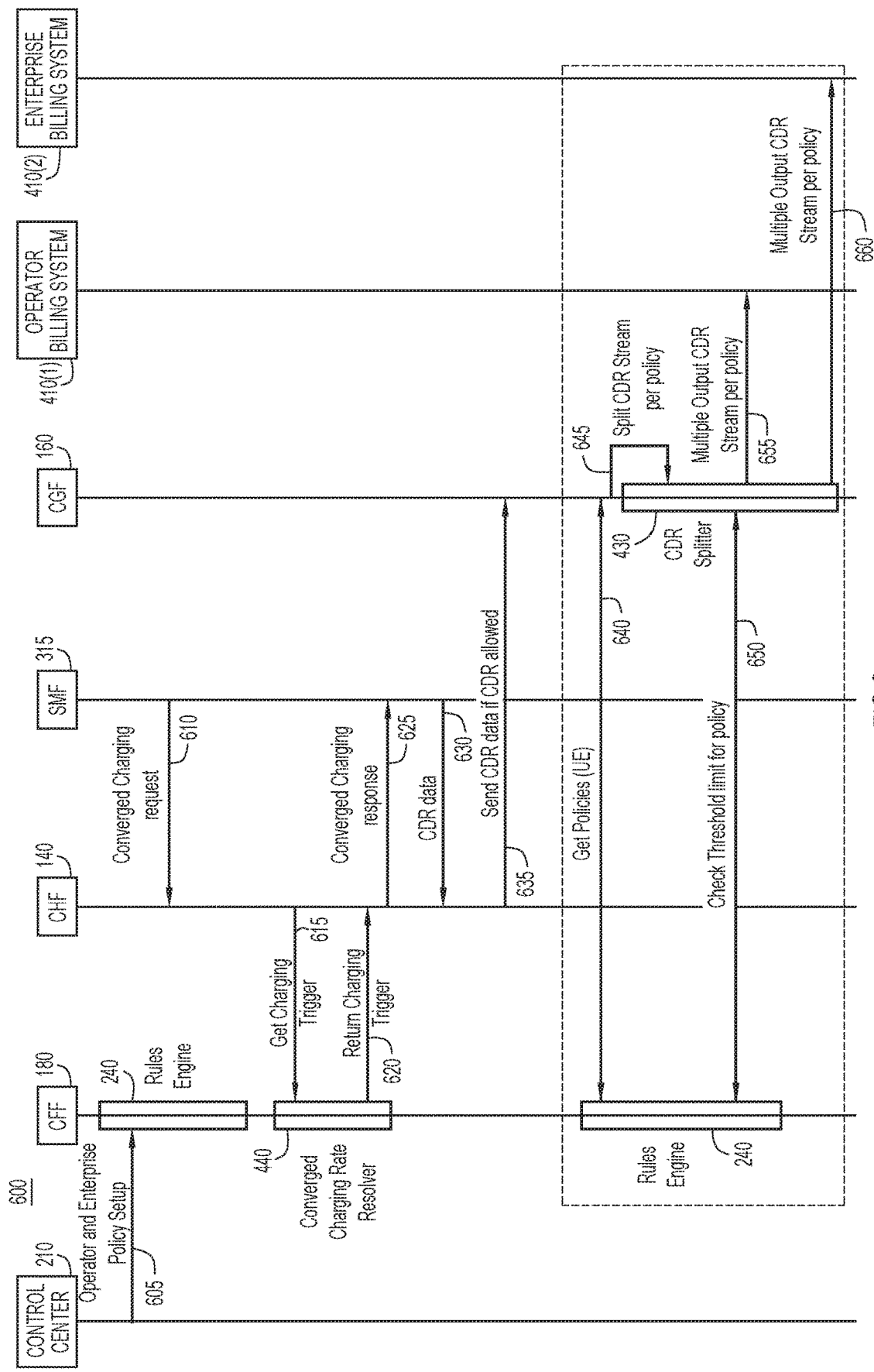
FIG. 6 illustrates a sequence flow diagram of a method for managing one or more rules that control whether or when one or more CDRs are to be provided to multiple billing systems based on one or more amounts of information to be carried in the one or more CDRs, according to an example embodiment.

With continued reference to FIGS. 1 and 2, FIG. 4 illustrates a block diagram of an example system 400. System 400 includes network function 110, converged charging system 120 (including CHF 140, CGF 160, and CFF 180), Control Center 210, third-party services 220, operator billing system 410(1), and enterprise billing system 410(2). In this example, CGF 160 includes CDR aggregator 420 and CDR splitter 430, and CFF 180 includes rules engine 240, notification service 250, rules repository 260, and converged charging rate resolver 440.

Unlike system 200, system 400 includes multiple billing systems, namely operator billing system 410(1) and enterprise billing system 410(2). Operator billing system 410(1) may have a network operator associated therewith, and enterprise billing system 410(2) may have an enterprise associated therewith. Operator requirements regarding whether or when CDRs should be provided to operator billing system 410(1) may differ from enterprise requirements regarding whether or when CDRs should be provided to enterprise billing system 410(2).

In one example, it may be desirable to provide operator billing system 410(1) with CDRs that carry an amount of information above a minimum threshold, and provide enterprise billing system 410(2) with CDRs that carry any amount of information. For instance, the enterprise may be interested in zero-byte CDRs to track UE keep-alive messages even when the UE is not in use, whereas the operator may not be interested in keep-alive zero-byte CDRs. In another example, it may be desirable to provide operator billing system 410(1) with CDRs at a finer granularity to meet network operation management needs (e.g., once every second), and provide enterprise billing system 410(2) with CDRs at a lower granularity (e.g., once every fifteen minutes).

Accordingly, CFF 180 may support filtering behaviors for different rules defined by different enterprise and operator entities to enable suppressing certain CDRs based on entity intent. The CDRs may be associated with the same UE but may be provided to operator billing system 410(1) and enterprise billing system 410(2) according to different usage thresholds or at different rates. Thus, CFF 180 may provide the ability for different CDR generation frequencies, or generation of different sets of CDRs, based on different classes of entities or different entity policies. In one example, CFF 180 may support divergent filtering behaviors for different network entities (e.g., enterprises, operators, etc.) for a single charging event in order to allow entity intent-based filtering behavior by allowing entities to define separate policy rules for a single charging event. This may enable suppressing CDR generation based on usage volume threshold policies, and/or rate-limiting CDR generation whereby CDRs are generated at different rates, for the same UE but for different entities.

While system 100 illustrates operator billing system 410(1) and enterprise billing system 410(2), it will be appreciated that techniques described herein may be applied to any suitable number of billing systems associated with any suitable entities. For instance, there may be multiple enterprise billing systems associated with respective enterprises that have different requirements from each other. In an example involving multiple enterprise billing systems, one enterprise may require CDRs every fifteen minutes, whereas another enterprise may require CDRs every thirty minutes. Enterprise requirements may also vary based on a number of UEs are associated with, or expected to be associated with, the relevant billing system. Multiple operator billing systems associated with respective operators may also have different requirements from each other.

CGF 160 may communicate with CFF 180 to gain context for different generation rates for different entities (e.g., operator billing system 410(1) and enterprise billing system 410(2)). CGF 160 may use any context received from CFF 180 to implement CDR aggregator 420 and CDR splitter 430. Briefly, CDR aggregator 420 may handle CDR aggregation to support different rates of generation for a given UE according to one or more defined filtering rules, and CDR splitter 430 may provide, to different entities (e.g., both operator billing system 410(1) and enterprise billing system 410(2)), multiple CDR output streams associated with a given UE for a charging record.

CFF 180 may provide one or more rules to control whether or when the one or more CDRs associated with a UE are to be aggregated before being provided to operator billing system 410(1) and/or enterprise billing system 410(2). In one example, CGF 160 may obtain one or more usage records, consult with CFF 180 for any applicable rate-limit filtering policies/rules, and aggregate the usage records according to the defined rules. Consider an scenario in which the operator defines a rule for operator billing system 410(1) to receive a CDR for the UE once every fifteen minutes, and the enterprise defines a rule for enterprise billing system 410(2) to receive a CDR for the UE once every thirty minutes.

Here, CDR aggregator 420 may obtain a CDR to be provided to enterprise billing system 410(2) every fifteen minutes. However, because enterprise billing system 410(2) is to obtain a CDR every thirty minutes, CDR aggregator 420 may wait an additional fifteen minutes for an additional CDR to be provided to enterprise billing system 410(2) and aggregate the CDR and the additional CDR into one aggregated CDR which is provided to enterprise billing system 410(2). Enterprise billing system 410(2) may thus obtain an aggregated CDR every thirty minutes in this manner. It will be appreciated that CDR aggregator 420 may also/alternatively determine whether to generate CDRs for a usage record according to usage filtering rules defined in CFF 180.

CFF 180 may also/alternatively provide one or more rules to control whether or when one or more CDRs associated with a UE are to be split before being provided to operator billing system 410(1) and enterprise billing system 410(2). CDR splitter 430 may interact with operator billing system 410(1) and enterprise billing system 410(2) to provide any desired CDR streams for north-bound processing. Consider the aforementioned scenario in which the operator defines a rule for operator billing system 410(1) to receive a CDR for the UE once every fifteen minutes, and the enterprise defines a rule for enterprise billing system 410(2) to receive a CDR for the UE once every thirty minutes. Here, CDR splitter 430 may split an aggregated CDR once every thirty minutes to generate a first CDR for operator billing system 410(1) and a second CDR for enterprise billing system 410(2).

Thus, in one specific example, at a first point in time CDR splitter 430 splits the CDR and sends the split CDRs to operator billing system 410(1) and enterprise billing system 410(2). Fifteen minutes later, CDR splitter 430 refrains from the splitting the CDR and the CDR is sent to operator billing system 410(1) but not to enterprise billing system 410(2). Fifteen minutes later, the cycle begins repeats, with CDR splitter 430 splitting the CDR and sending the split CDRs to operator billing system 410(1) and enterprise billing system 410(2). Thus, operator billing system 410(1) obtains a CDR once every fifteen minutes, and enterprise billing system 410(1) obtains a CDR once every thirty minutes. It will be appreciated that CDR splitter 430 may also/alternatively determine whether to generate CDRs for a usage record according to usage filtering rules defined in CFF 180.

Converged charging rate resolver 440 may be responsible for resolving trigger condition conflicts for a given UE amongst multiple rate-limit filtering rules (e.g., conflicting filtering policies) on behalf of network function 110 and support desired CDR rate trigger generation for the operator and the enterprise. In one example, converged charging rate resolver 440 determines that a rule controls whether or when the one or more CDRs associated with a UE are to be provided to operator billing system 410(1) based on a first frequency at which the one or more CDRs are to be provided to operator billing system 410(1). Converged charging rate resolver 440 further determines that a second rule controls whether or when the one or more CDRs associated with the UE are to be provided to enterprise billing system 410(2) based on a second frequency at which the one or more CDRs are to be provided to enterprise billing system 410(2). In one example, converged charging rate resolver 440 may fetch all applicable rate-limit policies for the UE and the given charging record.

In this example, the second frequency is a multiple of the first frequency. For instance, the first frequency may be once every fifteen minutes, and the second frequency may be once every thirty minutes. In other words, the operator may define a rule for operator billing system 410(1) to receive a CDR for the UE once every fifteen minutes, and the enterprise may define a rule for enterprise billing system 410(2) to receive a CDR for the UE once every thirty minutes.

Converged charging rate resolver 440 may provide one or more rules that control whether or when the one or more CDRs associated with the UE are to be provided to operator billing system 410(1) and enterprise billing system 410(2) based on the first frequency (e.g., once every fifteen minutes). In one example, converged charging rate resolver 440 may compute the minimum trigger duration (e.g., the minimum time rate-limit frequency, which is fifteen minutes in this example) and send an indication of the trigger duration (e.g., fifteen minutes) to CHF 140. This may prompt CHF 140 to instruct network function 110 to restrict the rate limit for future usage records.

Table 2 below illustrates example rules that may be stored by rules repository 260 defined by the operator for operator billing system 410(1) and by the enterprise for enterprise billing system 410(2) for various UEs. The "Defined by Role" column designates the rule as belonging to the enterprise or the operator, and CFF 180 may support desired behavior for both entities accordingly. The numbers in the "Threshold" column may be measured in bytes, and the numbers in the "Rate Limit" column may be measured in seconds.

TABLE 2

| Rule ID | Rule Type | Description | Defined By Role | Min SUPI | Max SUPI | Threshold | Rate Limit | Custom Trigger |
|---|---|---|---|---|---|---|---|---|
| 1-1 | Usage | Suppress CDR generation for usages <5 | Enterprise | 10001 | 10010 | 5 | NA | NA |
| 1-2 | Usage | Suppress CDR generation for usages <15 | Operator | 10001 | 10010 | 15 | NA | NA |
| 2-1 | Rate limit | Limit the generation rate to per 1800 seconds frequency | Enterprise | 30001 | 30010 | NA | 1800 | NA |

TABLE 2-continued

| Rule ID | Rule Type | Description | Defined By Role | Min SUPI | Max SUPI | Threshold | Rate Limit | Custom Trigger |
|---|---|---|---|---|---|---|---|---|
| 2-2 | Rate limit | Limit the generation rate to per 900 seconds frequency | Operator | 30001 | 30010 | NA | 900 | NA |
| 3-1 | Custom | Suppress CDR generation for usages <5 when device moves to Roaming ('Atlanta') | Enterprise | 50002 | 60023 | 5 | NA | On location change: destination = 'Atlanta' |
| 3-2 | Custom | Suppress CDR generation for usages < 5 when device moves to Roaming ('Atlanta') | Operator | 50002 | 60023 | 5 | NA | On location change: destination = 'Atlanta' |

In one example, rules engine 240 may filter out a charging volume based on the usage threshold rules illustrated in Table 2. Consider a UE with a SUPI of 10002 that generates a charge record of usage two bytes. Based on the SUPI, rules engine 240 may identify the applicable rule as Rules 1-1 and 1-2. Example pseudocode for executing Rules 1-1 and 1-2 is provided as follows.

```
Usage Rule-x, Usage Rule-y -> {
minThresholdUsage = findMin(x.threshold , y.threshold)
IF ( (SUPI.usage <= minThresholdUsage))
then return SKIP_CDR_GENERATION;
ELSE
Break;
}
```

Once the CDRs are generated, different streams may be generated for operator billing system 410(1) and enterprise billing system 410(2) (e.g., by CDR splitter 430) according to the following example pseudocode.

```
Enterprise Usage Rule-x -> {
IF ( (SUPI.usage <= x.threshold))
then return SKIP_CDR_GENERATION;
ELSE
Append the CDR to enterprise data stream;
}
Operator Usage Rule-y -> {
IF ( (SUPI.usage <= y.threshold))
then return SKIP_CDR_GENERATION;
ELSE
Append the CDR to Operator data stream;
}
```

In another example, rules engine 240 may rate-limit CDR generation based on the rate-limit filtering rules illustrated in Table 2. Consider a UE with a SUPI of 30002 that generates a charge record of usage ten bytes. Based on the SUPI, rules engine 240 may identify the applicable rule as Rule 2-1 and 2-2. CDRs may be generated and aggregated for operator billing system 410(1) and enterprise billing system 410(2) (e.g., by CDR aggregator 420) according to the following example pseudocode.

```
RateLimit Rule-x , RateLimit Rule-y -> {
minRatelimit = findMin(x.ratelimit , y.ratelimit)
Prepare CHF 140 response triggers for records generation at minRatelimit
frequency.
}
```

With continuing reference to FIGS. 1-3, FIG. 5 illustrates an example sequence flow diagram of method 500 for managing one or more rules that control whether or when one or more CDRs are to be provided to operator billing system 410(1) and enterprise billing system 410(2) based on one or more frequencies at which the one or more CDRs are to be provided to operator billing system 410(1) and enterprise billing system 410(2). Method 500 relates to multiple rate limit filtering rules for various entities that may be supported for a single UE (e.g., UE 305), to enable rate-limiting policies based CDR generation. Method 500 may involve operations performed by various actors, including Control Center 210, CFF 180, CHF 140, SMF 315, CGF 160, and enterprise billing system 410(2).

At operation 505, CFF 180 (e.g., rules engine 240) obtains, from Control Center 210, respective policy setup instructions (e.g., filtering rules) for the operator and the enterprise. This may allow entities to configure policies on CFF 180 (e.g., via Control Center 210). At operation 510, CHF 140 obtains a converged charging request from SMF 315. The converged charging request may be a request for a CDR trigger. At operation 515, CFF 180 obtains a request for a charging time trigger from CHF 140. The request may permit CHF 140 to consult with CFF 180 to determine the trigger.

At operation 520, CFF 180 (e.g., rules engine 240) identifies the relevant policies for UE 305. At operation 525, CFF 180 (e.g., converged charging rate resolver 440) computes a minimum time granularity trigger. By way of example, different entities may request different CDR rates, and converged charging rate resolver 440 may identify the minimum CDR rate. For instance, if the operator requests one or more CDRs once every fifteen minutes, and the enterprise requests one or more CDRs once every thirty minutes, converged charging rate resolver 440 may identify the minimum granularity as fifteen minutes.

At operation 530, CFF 180 provides the time trigger (e.g., fifteen minutes) to CHF 140. At operation 535, CHF 140 provides the time trigger to SMF 315. At operation 540, CHF 140 obtains usage data (e.g., a CDR) from SMF 315 after the trigger duration (e.g., fifteen minutes). At operation 545, CHF 140 automatically forwards the usage data to CGF 160 in response to obtaining the usage data from SMF 315.

At operation 550, CGF 160 (e.g., CDR aggregator 420 and/or CDR splitter 430) consults with CFF 180 to determine whether aggregation/splitting is needed (e.g., which of operator billing system 410(1) and enterprise billing system 410(2) should receive data, and when). For example, CGF 160 may provide a policy details fetch request to CFF 180, and CFF 180 may respond with the appropriate rules. At operation 555, CGF 160 (e.g., CDR aggregator 420) performs CDR aggregation on a per-policy basis. At operations 560 and 565, CGF 160 (e.g., CDR splitter 430) provides, to operator billing system 410(1) and enterprise billing system 410(2), multiple output CDR streams per policy.

With continuing reference to FIGS. 1-3, FIG. 6 illustrates an example sequence flow diagram of a method 600 for managing one or more rules that control whether or when one or more CDRs are to be provided to operator billing system 410(1) and enterprise billing system 410(2) based on one or more amounts of information to be carried in the one or more CDRs. Method 600 relates to multiple rate limit filtering rules for various entities may be supported for a single UE (e.g., UE 305), to enable rate-limiting policy based CDR generation. Method 600 may involve operations performed by various actors, including Control Center 210, CFF 180, CHF 140, SMF 315, CGF 160, operator billing system 410(1), and enterprise billing system 410(2).

At operation 605, CFF 180 (e.g., rules engine 240) obtains, from Control Center 210, respective policy setup instructions (e.g., filtering rules) for the operator and the enterprise. This may allow entities to configure policies on CFF 180 (e.g., via Control Center 210). At operation 610, CHF 140 obtains a converged charging request from SMF 315. The converged charging request may be a request for a CDR trigger. At operation 615, CFF 180 obtains a request for a charging trigger from CHF 140. The request may permit CHF 140 to consult with CFF 180 to determine the trigger. At operation 620, CFF 180 provides the charging trigger (e.g., a minimum threshold such as 1 MB) to CHF 140. At operation 625, CHF 140 provides a converged charging response to SMF 315. At operation 630, CHF 140 obtains CDR data from SMF 315. At operation 635, CHF 140 sends the CDR data to CGF 160 if the CDR data carries more information than the minimum threshold.

At operation 640, in response to obtaining the CDR data from CHF 140, CGF 160 (e.g., CDR splitter 430) consults with CFF 180 to determine whether splitting is needed (e.g., which of operator billing system 410(1) and enterprise billing system 410(2) should receive data, and when). For example, CGF 160 may provide a policy details fetch request for UE 305 to CFF 180, and CFF 180 may respond with the appropriate rules. At operation 645, CGF 160 (e.g., CDR splitter 430) performs CDR splitting on a per-policy basis. At operation 650, CGF 160 (e.g., CDR splitter 430) consults with CFF 180 to determine the threshold limit for the relevant policy. At operations 655 and 660, CGF 160 (e.g., CDR splitter 430) provides, to operator billing system 410(1) and enterprise billing system 410(2), multiple CDR output streams per policy. Thus, CDRs may be generated based on usage volume threshold policy, and multiple usage-based filtering rules (e.g., for enterprises/operators) may be supported for a single device (e.g., UE 305).

Figure 7:
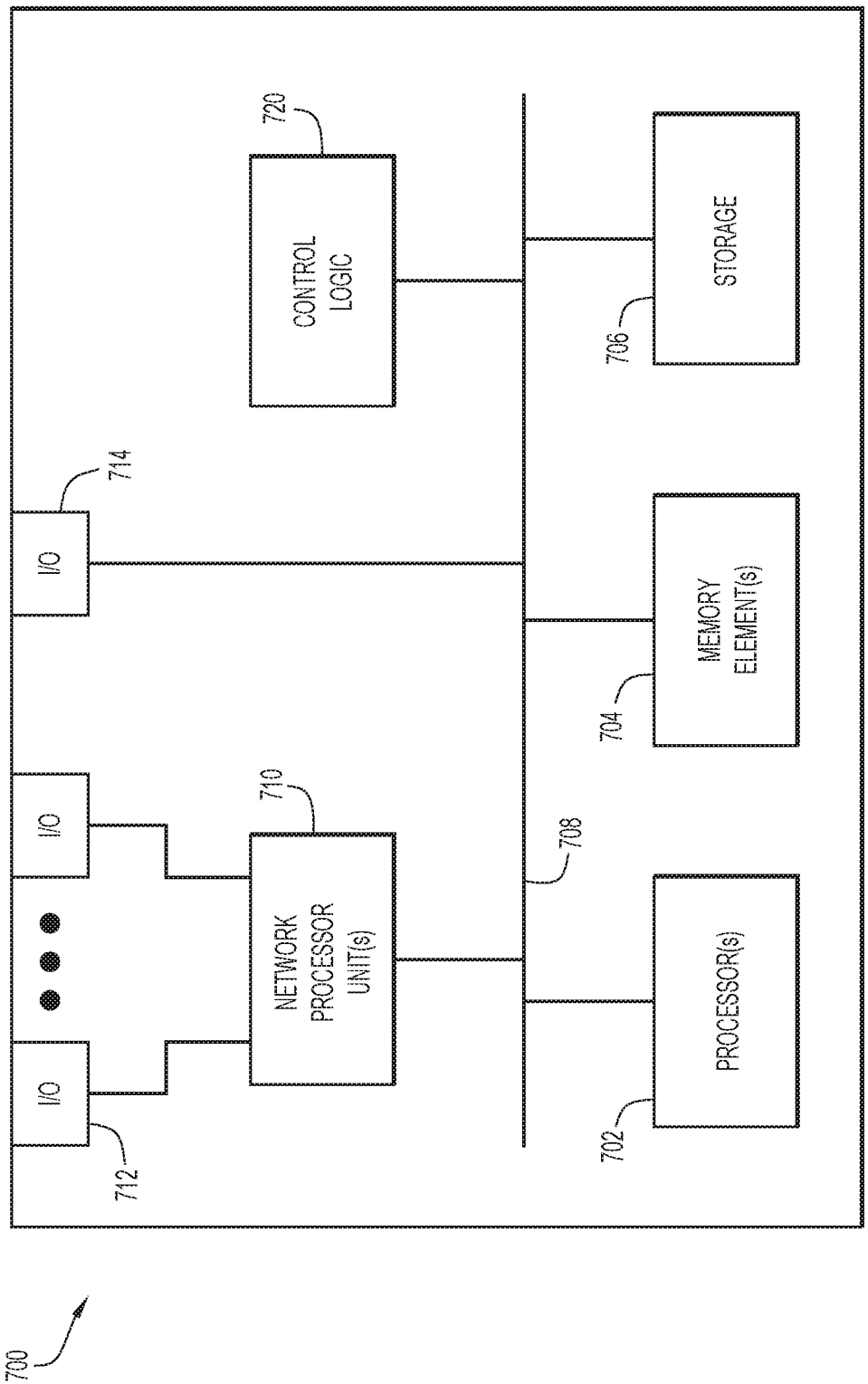
FIG. 7 illustrates a hardware block diagram of a computing device configured to perform functions associated with operations discussed herein, according to an example embodiment.

Referring to FIG. 7, FIG. 7 illustrates a hardware block diagram of a computing device 700 that may perform functions associated with operations discussed herein in connection with the techniques depicted in FIGS. 1-6. In various embodiments, a computing device, such as computing device 700 or any combination of computing devices 700, may be configured as any entity/entities as discussed for the techniques depicted in connection with FIGS. 1-6 in order to perform operations of the various techniques discussed herein.

In at least one embodiment, computing device may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, and/or any other I/O port(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computer device 700. For example, I/O interface(s) 714 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), Application Specific Integrated Circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

FIG. 8 is a flowchart of an example method 800 for performing functions associated with operations discussed herein. Method 800 may be performed at a mobile core network, and may be performed by a CFF (e.g., CFF 180). At operation 810, CFF 180 may obtain a request for one or more rules that control whether or when one or more CDRs associated with a UE are to be provided to one or more billing systems, wherein the request includes an identification of the UE. At operation 820, based on the identification of the UE, CFF 180 may identify the one or more rules. At operation 830, CFF 180 may provide the one or more rules to control whether or when the one or more CDRs associated with the UE are to be provided to the one or more billing systems.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In one form, a method is provided. The method comprises: at a mobile core network: obtaining a request for one or more rules that control whether or when one or more charging data records associated with a user equipment are to be provided to one or more billing systems, wherein the request includes an identification of the user equipment; based on the identification of the user equipment, identifying the one or more rules; and providing the one or more rules to control whether or when the one or more charging data records associated with the user equipment are to be provided to the one or more billing systems.

In one example, obtaining the request for the one or more rules includes: obtaining a request for one or more rules that control whether or when the one or more charging data records associated with the user equipment are to be provided to the one or more billing systems based on an amount of information to be carried in the one or more charging data records.

In one example, obtaining the request for the one or more rules includes: obtaining a request for one or more rules that control whether or when the one or more charging data records associated with the user equipment are to be provided to the one or more billing systems based on a frequency at which the one or more charging data records are to be provided to the one or more billing systems.

In a further example, the method further comprises: at the mobile core network: determining that a first rule controls whether or when the one or more charging data records associated with the user equipment are to be provided to a first billing system of the one or more billing systems based on a first frequency at which the one or more charging data records are to be provided to the first billing system; and determining that a second rule controls whether or when the one or more charging data records associated with the user equipment are to be provided to a second billing system of the one or more billing systems based on a second frequency at which the one or more charging data records are to be provided to the second billing system, wherein the second frequency is a multiple of the first frequency, and wherein providing the one or more rules includes providing one or more rules that control whether or when the one or more charging data records associated with the user equipment are to be provided to the one or more billing systems based on the first frequency.

In one example, obtaining the request for the one or more rules includes: obtaining a request for one or more rules that control whether or when the one or more charging data records associated with the user equipment are to be provided to the one or more billing systems based on a location of the user equipment.

In one example, the method further comprises: at the mobile core network: obtaining the one or more rules from one or more entities associated with the one or more billing systems, wherein the one or more rules are generated by the one or more entities associated with the one or more billing systems.

In one example, the method further comprises: at the mobile core network: providing the one or more rules to control whether or when the one or more charging data records associated with the user equipment are to be aggregated before being provided to the one or more billing systems.

In one example, the method further comprises: at the mobile core network: providing the one or more rules to control whether or when the one or more charging data records associated with the user equipment are to be split before being provided to a first billing system of the one or more billing systems and a second billing system of the one or more billing systems.

In one example, obtaining the request for the one or more rules includes obtaining the request for the one or more rules from a charging function or a charging gateway function; and providing the one or more rules includes providing the one or more rules includes to the charging function or the charging gateway function.

In another form, an apparatus is provided. The apparatus comprises: a network interface configured to obtain or provide network communications in a mobile core network; and one or more processors coupled to the network interface, wherein the one or more processors are configured to: obtain a request for one or more rules that control whether or when one or more charging data records associated with a user equipment are to be provided to one or more billing systems, wherein the request includes an identification of the user equipment; based on the identification of the user equipment, identify the one or more rules; and provide the one or more rules to control whether or when the one or more charging data records associated with the user equipment are to be provided to the one or more billing systems.

In another form, one or more non-transitory computer readable storage media are provided. The non-transitory computer readable storage media are encoded with instructions that, when executed by a processor in a mobile core network, cause the processor to: obtain a request for one or more rules that control whether or when one or more charging data records associated with a user equipment are to be provided to one or more billing systems, wherein the request includes an identification of the user equipment; based on the identification of the user equipment, identify the one or more rules; and provide the one or more rules to control whether or when the one or more charging data records associated with the user equipment are to be provided to the one or more billing systems.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   at a mobile core network:
      obtaining a request for one or more rules that control whether or when one or more charging data records associated with a user equipment are to be provided to one or more billing systems, wherein the request includes an identification of the user equipment;
      based on the identification of the user equipment, identifying the one or more rules; and
      providing the one or more rules to control whether or when the one or more charging data records associated with the user equipment are to be provided to the one or more billing systems.

2. The method of claim 1, wherein obtaining the request for the one or more rules includes:
   obtaining a request for one or more rules that control whether or when the one or more charging data records associated with the user equipment are to be provided to the one or more billing systems based on an amount of information to be carried in the one or more charging data records.

3. The method of claim 1, wherein obtaining the request for the one or more rules includes:
   obtaining a request for one or more rules that control whether or when the one or more charging data records associated with the user equipment are to be provided to the one or more billing systems based on a frequency at which the one or more charging data records are to be provided to the one or more billing systems.

4. The method of claim 3, further comprising:
   at the mobile core network:
      determining that a first rule controls whether or when the one or more charging data records associated with the user equipment are to be provided to a first billing system of the one or more billing systems based on a first frequency at which the one or more charging data records are to be provided to the first billing system; and
      determining that a second rule controls whether or when the one or more charging data records associated with the user equipment are to be provided to a second billing system of the one or more billing systems based on a second frequency at which the one or more charging data records are to be provided to the second billing system, wherein the second frequency is a multiple of the first frequency, and wherein providing the one or more rules includes providing one or more rules that control whether or when the one or more charging data records associated with the user equipment are to be provided to the one or more billing systems based on the first frequency.

5. The method of claim 1, wherein obtaining the request for the one or more rules includes:

obtaining a request for one or more rules that control whether or when the one or more charging data records associated with the user equipment are to be provided to the one or more billing systems based on a location of the user equipment.

6. The method of claim 1, further comprising:

at the mobile core network:

obtaining the one or more rules from one or more entities associated with the one or more billing systems, wherein the one or more rules are generated by the one or more entities associated with the one or more billing systems.

7. The method of claim 1, further comprising:

at the mobile core network:

providing the one or more rules to control whether or when the one or more charging data records associated with the user equipment are to be aggregated before being provided to the one or more billing systems.

8. The method of claim 1, further comprising:

at the mobile core network:

providing the one or more rules to control whether or when the one or more charging data records associated with the user equipment are to be split before being provided to a first billing system of the one or more billing systems and a second billing system of the one or more billing systems.

9. The method of claim 1, wherein:

obtaining the request for the one or more rules includes obtaining the request for the one or more rules from a charging function or a charging gateway function; and providing the one or more rules includes providing the one or more rules includes to the charging function or the charging gateway function.

10. The method of claim 1, wherein the obtaining, the identifying, and the providing are performed by a charging filtering function.

11. An apparatus comprising:

a network interface configured to obtain or provide network communications in a mobile core network; and one or more processors coupled to the network interface, wherein the one or more processors are configured to:

obtain a request for one or more rules that control whether or when one or more charging data records associated with a user equipment are to be provided to one or more billing systems, wherein the request includes an identification of the user equipment;

based on the identification of the user equipment, identify the one or more rules; and provide the one or more rules to control whether or when the one or more charging data records associated with the user equipment are to be provided to the one or more billing systems.

12. The apparatus of claim 11, wherein the one or more processors are configured to:

obtain a request for one or more rules that control whether or when the one or more charging data records associated with the user equipment are to be provided to the one or more billing systems based on an amount of information to be carried in the one or more charging data records.

13. The apparatus of claim 11, wherein the one or more processors are configured to:

obtain a request for one or more rules that control whether or when the one or more charging data records associated with the user equipment are to be provided to the one or more billing systems based on a frequency at which the one or more charging data records are to be provided to the one or more billing systems.

14. The apparatus of claim 13, wherein the one or more processors are configured to:

determine that a first rule controls whether or when the one or more charging data records associated with the user equipment are to be provided to a first billing system of the one or more billing systems based on a first frequency at which the one or more charging data records are to be provided to the first billing system;

determine that a second rule controls whether or when the one or more charging data records associated with the user equipment are to be provided to a second billing system of the one or more billing systems based on a second frequency at which the one or more charging data records are to be provided to the second billing system, wherein the second frequency is a multiple of the first frequency; and provide one or more rules that control whether or when the one or more charging data records associated with the user equipment are to be provided to the one or more billing systems based on the first frequency.

15. The apparatus of claim 11, wherein the one or more processors are configured to:

obtain a request for one or more rules that control whether or when the one or more charging data records associated with the user equipment are to be provided to the one or more billing systems based on a location of the user equipment.

16. The apparatus of claim 11, wherein the one or more processors are configured to:

obtain the one or more rules from one or more entities associated with the one or more billing systems, wherein the one or more rules are generated by the one or more entities associated with the one or more billing systems.

17. One or more non-transitory computer readable storage media encoded with instructions that, when executed by a processor in a mobile core network, cause the processor to:

obtain a request for one or more rules that control whether or when one or more charging data records associated with a user equipment are to be provided to one or more billing systems, wherein the request includes an identification of the user equipment;

based on the identification of the user equipment, identify the one or more rules; and provide the one or more rules to control whether or when the one or more charging data records associated with the user equipment are to be provided to the one or more billing systems.

18. The one or more non-transitory computer readable storage media of claim 17, wherein the instructions further cause the processor to:

obtain a request for one or more rules that control whether or when the one or more charging data records associated with the user equipment are to be provided to the one or more billing systems based on an amount of information to be carried in the one or more charging data records.

19. The one or more non-transitory computer readable storage media of claim 17, wherein the instructions further cause the processor to:
obtain a request for one or more rules that control whether or when the one or more charging data records associated with the user equipment are to be provided to the one or more billing systems based on a frequency at which the one or more charging data records are to be provided to the one or more billing systems.

20. The one or more non-transitory computer readable storage media of claim 17, wherein the instructions further cause the processor to:
obtain a request for one or more rules that control whether or when the one or more charging data records associated with the user equipment are to be provided to the one or more billing systems based on a location of the user equipment.

\* \* \* \* \*